United States Patent
Grajek et al.

(10) Patent No.: US 9,473,310 B2
(45) Date of Patent: *Oct. 18, 2016

(54) IDENTITY-BASED CERTIFICATE MANAGEMENT

(71) Applicant: SecureAuth Corporation, Irvine, CA (US)

(72) Inventors: Garret Florian Grajek, Aliso Viejo, CA (US); Jeffrey Chiwai Lo, Irvine, CA (US); Mark V. Lambiase, Ladera Ranch, CA (US)

(73) Assignee: SecureAuth Corporation, Irvine, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/256,270

(22) Filed: Apr. 18, 2014

(65) Prior Publication Data

US 2014/0344567 A1    Nov. 20, 2014

Related U.S. Application Data

(63) Continuation of application No. 12/419,951, filed on Apr. 7, 2009, now Pat. No. 8,707,031.

(51) Int. Cl.
*H04L 9/32*    (2006.01)
*H04L 29/06*    (2006.01)

(52) U.S. Cl.
CPC ............ *H04L 9/3268* (2013.01); *H04L 9/3263* (2013.01); *H04L 9/3271* (2013.01); *H04L 9/3297* (2013.01); *H04L 63/0823* (2013.01); *H04L 2209/56* (2013.01); *H04L 2209/805* (2013.01)

(58) Field of Classification Search
CPC ............... H04L 9/3268; H04L 9/3263; H04L 63/0823; H04L 9/3271; H04L 9/3294

USPC ............. 713/156, 158, 168, 175; 726/10, 18
See application file for complete search history.

(56) References Cited

U.S. PATENT DOCUMENTS

| | | | |
|---|---|---|---|
| 4,868,877 A | 9/1989 | Fischer | |
| 5,881,226 A | 3/1999 | Veneklase | |
| 5,999,711 A | 12/1999 | Misra et al. | |
| 6,026,166 A | 2/2000 | LeBourgeois | |
| 6,035,406 A | 3/2000 | Moussa et al. | |
| 6,237,096 B1 | 5/2001 | Bisbee et al. | |
| 6,324,645 B1 | 11/2001 | Andrews et al. | |

(Continued)

FOREIGN PATENT DOCUMENTS

WO    WO 2008/039227    4/2008

OTHER PUBLICATIONS

Amir Herzberg et al, Access Control Meets Public Key Infrastructure, or: Assigning Roles to Strangers,pp. 2-14, IEEE, 2000.*

(Continued)

*Primary Examiner* — Shanto M Abedin
(74) *Attorney, Agent, or Firm* — Knobbe, Martens, Olson & Bear, LLP

(57) ABSTRACT

Methods for managing digital certificates, including issuance, validation, and revocation are disclosed. Various embodiments involve querying a directory service with entries that correspond to a particular client identity and have attributes including certificate issuance limits and certificate validity time values. The validity time values are adjustable to revoke selectively the certificates based upon time intervals set forth in validity identifiers included therein.

20 Claims, 6 Drawing Sheets

(56) References Cited

U.S. PATENT DOCUMENTS

| | | | |
|---|---|---|---|
| 6,842,863 B1* | 1/2005 | Fox | H04L 9/3263 713/156 |
| 6,940,979 B1* | 9/2005 | Bobbitt | H04L 9/006 380/277 |
| 7,120,929 B2 | 10/2006 | Beattie et al. | |
| 7,127,607 B1 | 10/2006 | Su et al. | |
| 7,131,009 B2 | 10/2006 | Scheidt et al. | |
| 7,140,036 B2 | 11/2006 | Bhagavatula et al. | |
| 7,143,286 B2 | 11/2006 | Brown et al. | |
| 8,024,562 B2* | 9/2011 | Gentry | H04L 9/3236 713/158 |
| 2002/0144119 A1 | 10/2002 | Benantar | |
| 2002/0184182 A1 | 12/2002 | Kwan | |
| 2004/0268148 A1 | 12/2004 | Karjala et al. | |
| 2005/0021969 A1* | 1/2005 | Williams | H04L 9/3268 713/176 |
| 2006/0059346 A1* | 3/2006 | Sherman | H04L 63/0823 713/175 |
| 2007/0130464 A1 | 6/2007 | Swedor et al. | |
| 2007/0150727 A1* | 6/2007 | Miyazawa | G06F 21/604 713/158 |
| 2007/0150737 A1* | 6/2007 | Parupudi | H04L 9/3263 713/175 |
| 2008/0065895 A1* | 3/2008 | Liu | H04L 9/3263 713/176 |
| 2008/0133906 A1* | 6/2008 | Parkinson | H04L 9/3236 713/156 |
| 2009/0276631 A1 | 11/2009 | Micali | |
| 2010/0115266 A1* | 5/2010 | Guo | H04L 9/006 713/156 |

OTHER PUBLICATIONS

Mary Thompson et al, Certificate-based Access Control for Widely Distributed Resources, USENIX, 1999.*

S. Farrell et al, An Internet Attribute Certificate Profile for Authorization, RFC 3281, Apr. 2002.*

Authentication in an Internet Banking Environment; Federal Financial Institutions Examination Council; 2001, 14 pages.

Dierks, T. et al., Network Working Group, The Transport Layer Security (TLS) Protocol Version 1.1, Apr. 2006, 88 pages.

Gutmann, Peter, Everything you Never Wanted to Know about PKI but were Forced to Find Out, University of Aukland, presentation, Aug. 2002, 48 pages.

http://www.articsoft.com/wp_pkUntro.htm Introducton to Public Key Infrastructure, printed Nov. 26, 2007,6 pages.

http://www.entrust.com/pki.htm What is a PKI?Dec. 8, 2006, 5 pages.

Housley, R., et al., Network Working Group, Internet X.509 Public Key Infrastructure Certificate and Certificate Revocation List (CRL) Profile, Apr. 2002, 108 pages.

Kent, S., Network Working Group, Privacy Enhancement for Internet Electronic Mail: Part II: Certificate-Based Key Management, Feb. 1993, 29 pages.

Marchesini, et al., Keyjacking: The Surprising Insecurity of Client-side SSL, Dartmouth College, Feb. 13, 2004, 16 pages.

Myers, M. et al., Network Working Group, X.509 Internet Public Key Infrastructure Online Certificate Status Protocol—OCSP, Jun. 1999, 21 pages.

* cited by examiner

28

| VERSION 36 |
| --- |
| SERIAL NUMBER 38 |
| SIGNATURE ALGORITHM 40 |
| ISSUER IDENTIFIER 42 |
| VALIDITY INDICATOR 44 (VALIDITY START TIME 44b, VALIDITY END TIME 44a) |
| SUBJECT IDENTIFIER 46 |
| CLIENT PUBLIC KEY 30 |
| CA SIGNATURE 32 |

FIG. 2

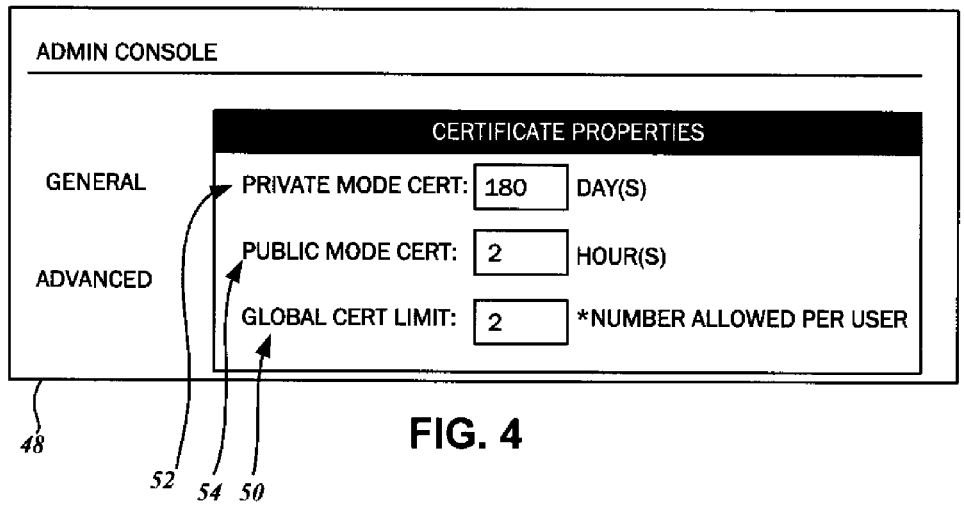
FIG. 4
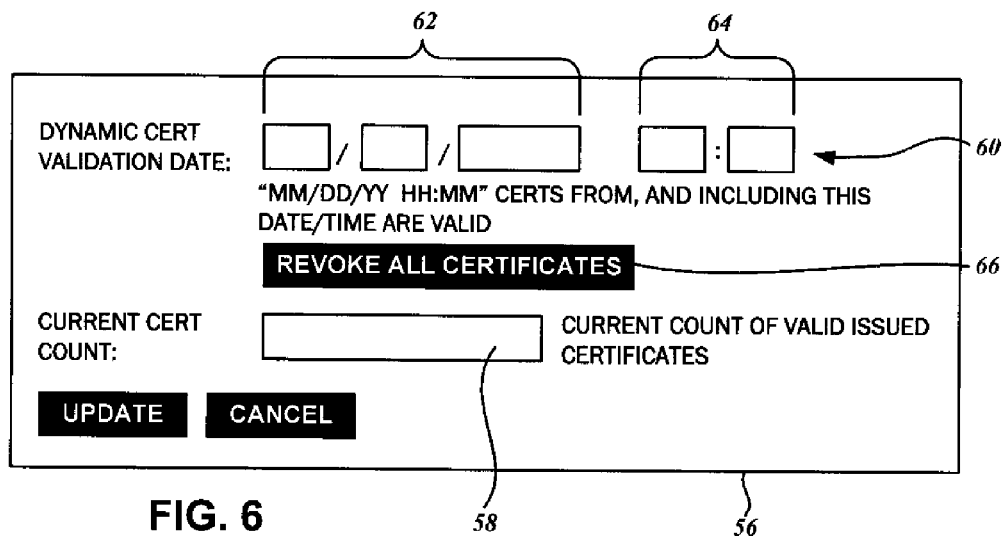
FIG. 5
FIG. 6

US 9,473,310 B2

IDENTITY-BASED CERTIFICATE MANAGEMENT

CROSS-REFERENCE TO RELATED APPLICATIONS

This application is a continuation of U.S. patent application Ser. No. 12/419,951 filed on Apr. 7, 2009, soon to issue as U.S. Pat. No. 8,707,031, the entire disclosure of which is hereby incorporated by reference.

BACKGROUND

1. Technical Field

The present invention relates generally to computer security and authentication. More particularly, the present invention relates to methods for issuing, validating, and revoking client certificates utilized in connection with bi-directional authentication between client and server computer systems.

2. Related Art

Banking, financial services, government education, and all varieties of enterprises rely upon advanced computer systems and data communications such as the Internet to transact and share information. While these advancements have greatly increased the speed and convenience with which business is conducted, numerous vulnerabilities can potentially compromise the security of the highly sensitive and confidential data being exchanged.

In an open network environment, the primary concern of data security is three-fold. First, the server must be assured that the server is what it asserts it is. Second, the client must be assured that the server is what it asserts it is. Third, any information being exchanged between a legitimate server and a legitimate client must not be intercepted or changed by any other computer system on the network.

The Public Key Infrastructure (PKI) is widely utilized to facilitate online transactions and address the aforementioned data security concerns. In general, public key encryption, also referred to as asymmetric-key encryption, involves a unique public/private key pair held by both the recipient of a message and its sender. When transmitting a message, the sender's private key and the recipient's public key are used to encrypt it. Upon receipt, the message is decrypted with the recipient's private key. The recipient's public key held by the sender corresponds to the recipient's private key, and only such private key is capable of decrypting the message. In proper implementations, it is understood that the private key cannot be derived from the corresponding public key.

In addition to the encryption and decryption functions, the cryptographic keys can be used to authenticate the message as being from the actual sender as it is purported to be. Specifically, a hash value of the message is generated, and the hash value is signed with the private key of the sender of the message to generate a message signature. These signatures may be generated according to a variety of well-known algorithms such as the Public Key Cryptography Standards #1 (PKCS#1), the Digital Signature Algorithm (DSA), the Secure Hash Algorithm (SHA), and others. Once received, the recipient confirms the authenticity of the message by validating the accompanying signature of the sender against the public key of the sender. A comparison of an independently generated hash value of the message against the received hash value validates the integrity of the message.

In a conventional public key infrastructure, the public key is bound to a particular identity by a certificate authority (CA) in a digital certificate that is issued following a registration and verification process. The CA is understood to be a trusted third party, and is responsible for confirming the identity of those to which it is issuing a digital certificate, whether that is an individual user, a specific machine or a set of machines in a network, an organization, or any other entity. The public key is signed with the digital signature of the CA to validate the digital certificate to any recipients thereof.

Digital certificates are utilized in a wide variety of contexts including e-commerce and enterprise data access that involve data exchange over open networks. Due to the availability of numerous client applications and servers implementing encryption and validation systems with digital certificates, the X.509 standard, which governs the structure and format thereof, has been promulgated. One common application is secure websites (https) in which the servers communicate with compliant browser clients over the Secure Sockets Layer/Transport Layer Security (SSL/TLS) protocol. SSL/TLS is understood to be a cryptographic protocol that provides data exchanges safe from eavesdropping, tampering, and forgery, and operates on the protocol layers below application-layer protocols such as the Transmission Control Protocol (TCP) or the User Datagram Protocol (UDP), but above transport-level protocols. SSL/TLS is not limited to HTTP, and other application-layer protocols such as Simple Mail Transfer Protocol (SMTP), Internet Message Access Protocol (IMAP), Post Office Protocol (POP), File Transfer Protocol (FTP) and the like may be carried over an SSL/TLS connection.

In establishing an SSL/TLS connection between a client and a server, the digital certificate for the server is transferred to the client for validation and encryption handshaking purposes. As indicated above, a third party CA signs the digital certificate, and the client validates the CA signature therein to ensure that it is, indeed, establishing a connection to the proper server. A session key based upon the received server public key may then be sent to the server to encrypt subsequent data.

Most conventional SSL/TLS servers deploy only server-side authentication as above, and so the client side remains unauthenticated to the server except via the most basic password-based access control modalities that have a substantial likelihood of being compromised. Client-side TLS can be utilized to establish a bilateral trust between the server and the client, which involves the installation of a private/public key pair on the client. The server validates the corresponding client certificate, which includes the public key signed by the CA, in the same manner as with the server certificate. Improvements over client-side TLS such as the SecureAuth system developed by MultiFactor Corporation of Irvine, Calif., the assignee of the present application, contemplate the issuance of digital certificates to the client as a second authentication factor.

Regardless of the particular uses, the issuance and revocation of the digital certificates is relatively uniform. In further detail, a digital certificate is understood to have subject data such as a user name, an expiration date, a public/private key pair, and a signature from a trusted CA. However, the validity of the digital certificate is based upon the expiration date and the signature, so if it has not yet expired and properly signed by a CA, then it is considered to be a valid credential.

A significant limitation of PKI is that once the certificate is issued, it will be considered a valid credential until it expires, and does not account for the possibility that the end user associated therewith is no longer permitted access due to departure from the organization, a change in access privileges, compromise of the digital certificate necessitating a re-issuance, and so forth. Because it may not be practical to retrieve the digital certificate, earlier systems have considered the use of a first list of all valid credentials, and a second list of all invalid credentials. One such system is the certificate revocation list or CRL (RFC 1422), which is a list of certificates that have been revoked or are no longer valid, and are consulted prior to validating the digital certificate. A CRL is periodically generated and published by the CA. Another modality is the Online Certificate Status Protocol or OCSP (RFC 2560), which is a communications protocol for querying the revocation status of the digital certificate.

Although OCSP represents an improvement over CRLs, both systems have inherent weaknesses that render deployment and maintenance difficult. Even after removing a user account from the system, the outstanding digital certificate may nevertheless allow access; in other words, digital certificate management is completely independent of the system users management. Moreover, the retrieval and consultation of a potentially large volume of data pertaining to the revoked/invalid certificates at each validation instance may place a significant burden on processing and network bandwidth resources. Accordingly, such systems found limited application only in small business-to-employee networks. The costs and complexity associated with the implementation of such systems in business-to-customer and web environments have altogether precluded market acceptance.

In light of these limitations, there exists a need in the art for methods for identity-based certificate management.

BRIEF SUMMARY

One aspect of the present invention contemplates a method for issuing a digital certificate to a client system. The digital certificate may be associated with a client identity. The method begins with receiving a certificate issuance request from the client system. The method also includes generating a first query to a directory service for a first entry associated with the client identity. This is contemplated to be in response to the certificate issuance request, in which the first entry has an attribute including an issuance count value. The method for issuing the digital certificate may include generating the digital certificate in response to a comparison of the issuance count value being less than a predefined issuance limit value, and concludes with issuing the digital certificate to the client system.

According to another aspect of the present invention, there a method for validating a digital certificate that is issued to a client system and associated with a client identity is provided. The method may include the step of receiving the digital certificate from the client system. The digital certificate may include a user identifier and a certificate validity period identifier, and the user identifier may correspond to the client identity. The method may further include a step of generating a first query to a directory service for a first entry associated with the client identity. The directory service may have at least one attribute including a validity time value. Thereafter, the method may include a step of receiving the validity time value returned by the first query, and may be followed by a step of validating the digital certificate in response to a first evaluation. The first evaluation may involve a comparison of the certificate validity period identifier against the received validity time value.

In yet another aspect, a method for revoking digital certificates associated with a client identity is contemplated. The method may include receiving a revocation request for a one of the digital certificates associated with the client identity. The revocation request may include a validity time stamp. The method may also include a step of setting a validity time value in a first entry of a directory service to the validity time stamp. Additionally, the method may include decrementing an issuance count value in the first entry. The issuance count value may be representative of a number of other outstanding digital certificates issued to the client identity. The digital certificates may include a user identifier corresponding to the client identity and a certificate validity period identifier, and the validity time value may be subsequent to the certificate validity period identifier of the one of the digital certificates.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 2 is an exemplary client certificate including various subparts thereof;

FIG. 4 is an example screen showing a first administration panel for setting the global options for client certificate management;

FIG. 5 is an example alert screen to the user showing an issuance count exceeded message;

FIG. 6 is an example screen of a second administration panel for setting the validity of the digital certificates associated with a particular client identity;

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
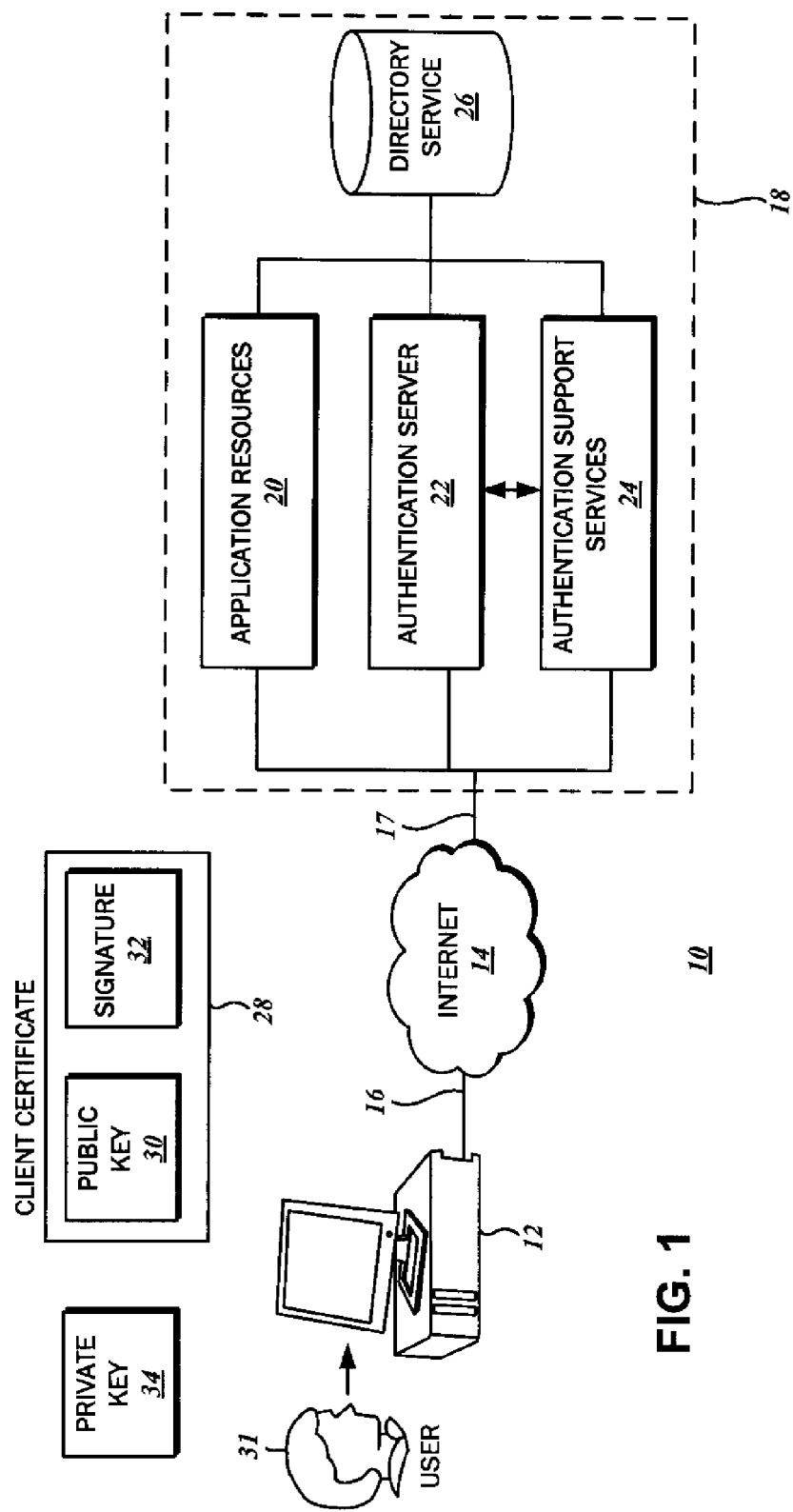
FIG. 1 is a block diagram of a networked computing environment including aspects of various embodiments of the invention, including a client computer system and an enterprise server system.

FIG. 1 depicts an exemplary networked computing environment 10 for implementing the identity-based certificate management methodologies in accordance with various embodiments of the present invention. The networked computing environment 10 includes a client computer system 12, which, by way of example only and not of limitation, is a conventional desktop computer having a central processing unit, memory, and input and output devices connected thereto such as keyboards, mice, and display units. The client computer system 12 is connected to a wide area network such as the Internet 14 via a network connection 16 to access a variety of available services. Those having ordinary skill in the art will readily appreciate the numerous possible variations with regard to the hardware devices that comprise the client computer system 12, as well as the network connection 16.

Though the client computer system 12 is capable of communicating with any other system on the Internet 14, the example shown in FIG. 1 depicts a link to an enterprise server system 18 generally. In this context, the term "client" is understood to refer to the role of the client computer system 12 as a requestor of data or services, while the term "server" is understood to refer to the role of the enterprise server system 18 to provide such data or services. There are a number of components that are a part of the enterprise server system 18, and specific reference thereto will be made as applicable. It is possible that the components of the enterprise server system 18 may request data or services in one transaction, and provide data or services in a different transaction. The enterprise server system 18 is also connected to the Internet 14 via network connections 17.

Primarily, the client computer system 12 accesses the enterprise server system 18 to utilize network application resources 20, with an authentication server 22 and authentication support services 24 having a security support role as will be described in further detail below. The network application resources 20 are referenced expansively and understood to include any kind of data processing functionality such as billing, payment processing, content management, e-mail, file sharing, customer relationship management, scheduling, business management, and so forth. Furthermore, beyond the aforementioned enterprise-level applications, the network application resources 20 are also understood to include services that are accessible by the public such as electronic banking and e-commerce. In this regard, one embodiment of the present invention envisions the network application resources 20 including a web server, application servers, and data stores.

The client computer system 12 is understood to have software instructions loaded thereon that, when executed, perform various functions in accordance with the various embodiments of the present invention. By way of example only and not of limitation, the client computer system 12 has a web browsing application such as Internet Explorer from Microsoft Corporation of Redmond, Wash., or Firefox from the Mozilla Foundation that communicate with the enterprise server system 18, and the application resources 20 in particular. The web browsing application has various secure data link features such as cryptographic certificate stores, encryption/decryption engines, digital signature validation engines, and the like.

Due to the multi-user nature of the network application resources 20, each user is provided an separate account to access the same. Furthermore, as a first layer of security to prevent unauthorized use, each account is protected with, for example, a password that is to be known only by the specific user. Instead of each application having its own account management functions, a directory service 26 that stores such account data may instead be utilized. It is understood that the directory service 26 functions as a central repository of all user account information across the enterprise server system 18. In addition to the foregoing basic account information, the directory service 26 includes other data such as mailing address, telephone numbers, e-mail addresses, organizational positions, and the like. A collection of data for a particular user in the aggregate is referred to herein as a client identity, and is uniquely referenced by an account name.

In one embodiment of the present invention, the directory service 26 complies with the lightweight directory access protocol (LDAP), and is based off the X.500 directory information services. Accordingly, a great deal of flexibility is afforded in the organization of the data stored in the directory service. By way of example, each entry in the directory service 26 is associated with a particular client identity, and has one or more attributes. The attributes, in turn, are defined by an attribute type and a corresponding attribute value. Other variants of the directory service 26 such as Active Directory from Microsoft Corp., OpenLDAP, and the like, may be substituted without departing from the scope of the present invention. Those having ordinary skill in the art will recognize that terms such as entries and attributes that may appear to be specific to the LDAP directory service 26 find ready correspondence to related features of such alternative directory services. Thus, it is to be understood that references thereto encompass those corresponding features.

Besides the aforementioned password-based access control to the network application resources 20, an additional level of security and authentication may include the validation of a client certificate 28 before granting access. Additionally, the client digital certificate may be utilized to encrypt communications traversing the open Internet 14. As indicated above, the client certificate 28 is generally comprised of a client public key 30 that is signed with a trusted third party/CA signature 32, and is associated with a particular client identity as set forth in the directory service 26. The client public key 30 has a corresponding client private key 34 that is retained solely in the client computer system 12. In particular, the client certificate 28 may be stored in the cryptographic store of the browser application of the client computer system 12. The application resources 20 can utilize the client public key 30 to determine that a user 31 of the client computer system 12, from which the client certificate 28 originates, has the authorization for access.

The client certificate 28, according to some embodiments, is an X.509 digital certificate as shown in FIG. 2. In addition to the client public key 30 and the Certificate Authority (CA) signature 34 mentioned above, the client certificate 28 may also include, for example, a version number 36, a serial number 38, a signature algorithm 40, an issuer identifier 42, a validity indicator 44 including a validity start time 44*a* and a validity end time 44*b*, and a subject identifier 46. The version number 36 identifies the version of the X.509 standard being used for the particular certificate, while the serial number 38 is a unique number assigned by a particular CA. The signature algorithm 40 defines the cryptographic algorithm utilized to generate the CA signature such as the Secure Hash Algorithm (SHA), Digital Signature Algorithm (DSA), and so forth. The issue identifier 42 includes the name of the CA that issued the digital certificate. Further details pertaining to the validity indicator and the particular uses of the validity start time 44*a* and the validity end time 44*b* will be described below, but in general, these values define the time period within which the client certificate can be presented as a proper credential. The subject identifier 46 contains the name of a person, group, or organization to which the certificate was issued, and generally corresponds to the same information of the client identity stored in the directory service 26.

According to the various embodiments of the present invention, methods for issuing, validating, and revoking the client certificate 28 without the use of Certificate Revocation Lists (CRLs) and/or the Online Certificate Status Protocol (OCSP) are contemplated. As will be considered in greater detail below, data stored in the directory service 26 establishes the validity or invalidity of the client certificate 28.

Figure 3:
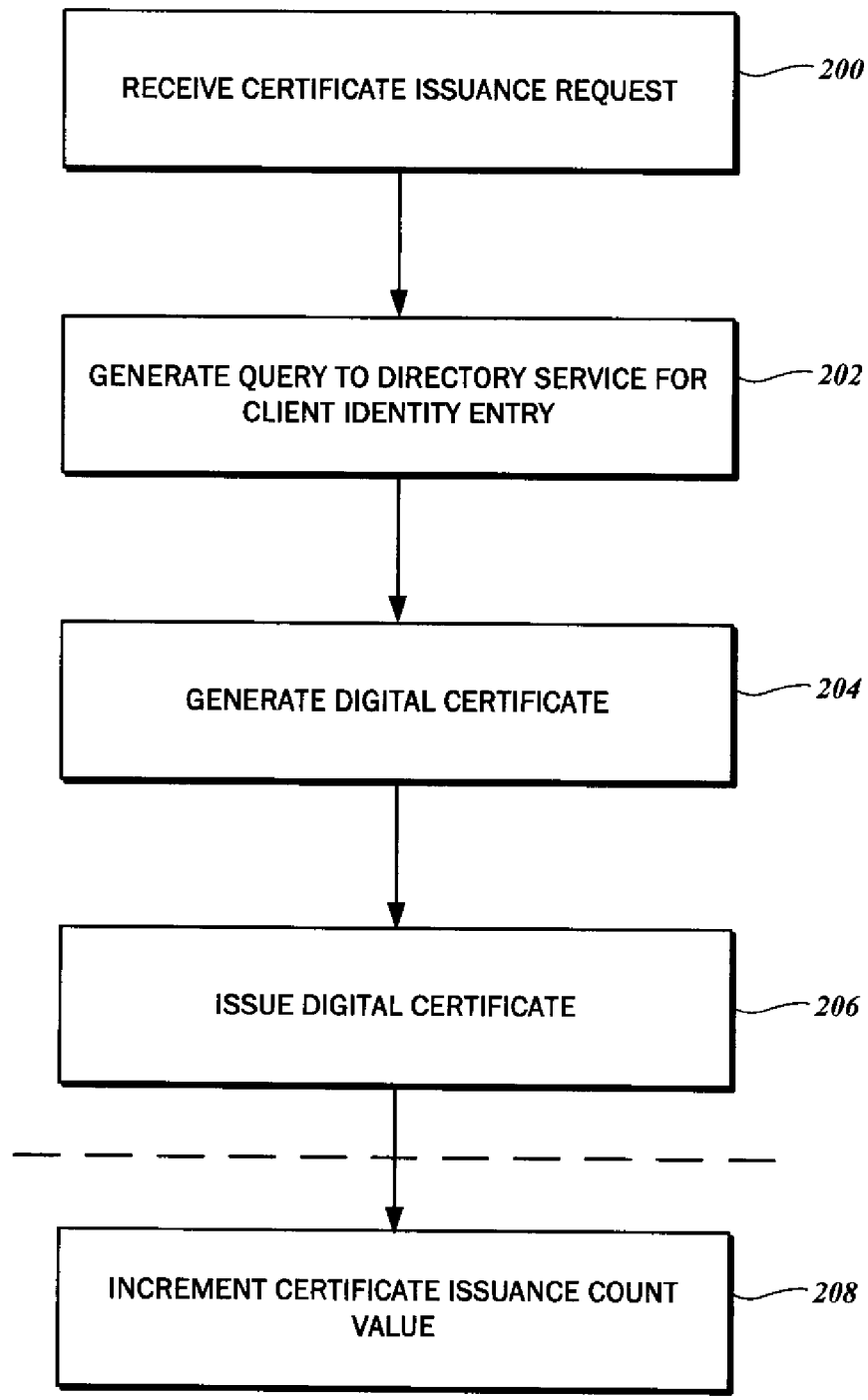
FIG. 3 is a flowchart illustrating a method for issuing the client certificate in accordance with one embodiment of the present invention.

With reference to the flowchart of FIG. 3, the method for issuing the client certificate 28 to the client computer system 12 begins with a step 200 of receiving a certificate issuance request. Upon receiving a request from the client computer system 12 to access the application resources 20, the authentication server 22 attempts to determine whether the client computer system 12 has stored thereon the client certificate 28. If the response from the client computer system 12 indicates that it does not have the client certificate 28, the authentication support services 24 are notified to begin the certificate issuance process. The aforementioned certificate issuance request is understood to encompass such a response that ultimately directs the authentication support services 24 to issue the client certificate 28. The authentication support services 24 may be on-site of the enterprise server system 18, or may be remote located and accessible over secure web services and the like.

Thereafter, the method continues with a step 202 of generating a query to the directory service 26 for an entry thereon associated with the client identity. In the course of initiating a transaction with the application resources 20, the account name, and hence the client identity under which access is being requested, is submitted. The query is generated in response to the certificate issuance request. The entry includes an issuance count value associated with the specific client identity, that is, the total number of digital certificates that have been issued.

As shown in an exemplary first administration panel 48 of FIG. 4 as generated by the authentication server 22, a variety of global certificate configuration options may be set. It is envisioned that the first administration panel is generated by an embedded hypertext transfer protocol (HTTP) server, and is accessible by a system administrator via a conventional web browser. According to one embodiment of the present invention, this includes a certificate issuance limit value 50, as well as a default private mode certificate validity duration 52 and a default public mode certificate validity duration 54. More particularly, the certificate issuance limit value 50 is set for each instance of the authentication server 22, and allows the administrator to limit the number of certificates that can be issued to any one user or client identity. As shown in the example alert screen of FIG. 5, any attempts by the user 31 to obtain an additional client certificate 28 is blocked when the number of certificates issued outstanding exceeds the certificate issuance limit value 50.

Provided that the returned issuance count value from the query to the directory service 26 is less than the certificate issuance limit value 50, the method continues with a step 204 of generating the client certificate 28. In this regard, a second administration panel 56 shown in FIG. 6 includes an editable field corresponding to the certificate issuance count value 58.

In some embodiments, however, prior to step 204 of generating client certificate 28, another separate authentication sequence is contemplated to ensure that the client computer system 12 and the user 31 thereof corresponds to the proper client identity as set forth in the directory service 26. The challenge may be transmitted to the user 31 via an out-of-band modality that is pre-associated with the specific client identity. For example, a Short Message Service (SMS) text message may be sent or a voice call may be made to a telephone number to convey a random token that is entered by the user 31 into the client computer system 12 that is transmitted to the authentication support services 24 for comparison. Alternatively, such a token may be transmitted to an e-mail address associated with the specific client identity. In lieu of, or in addition to the foregoing out-of-band authentication, the user 31 may be presented with a knowledge-based challenge. By way of example, the user may be asked about favorite colors, the names of various educational institutions attended, and other similar questions in which the answers are generally known only by a proper user.

The client certificate 28, including the client public key 30 and the client private key 34, are generated on the client computer system 12 at the direction of the authentication support services 24. The validity start time 44*a* of the client certificate 28 is set to be at or subsequent to the time and stamp when it is generated. Depending upon whether the client certificate 28 is a private mode or a public mode, the validity end time 44*b* is offset by the default private mode duration 52 and the default public mode duration 54, respectively, from the time stamp when the client certificate 28 is generated. As referenced herein, time stamp is understood to include a specific hour, date, and second value, as well as a month, date, and year value. Thus, the time stamp encompasses both the date and the time.

The generated client certificate 28 is then issued to the client computer system 12 according to step 206. In further detail, the client certificate 28 is installed in the cryptographic store of the browser application on the client computer system 12, and is accessible upon request from the authentication server 22. After issuing the client certificate 28, the authentication server 22 generates a second query to the directory service 26 that includes an increment of the issuance count value 58 associated with the client identity.

Figure 7:
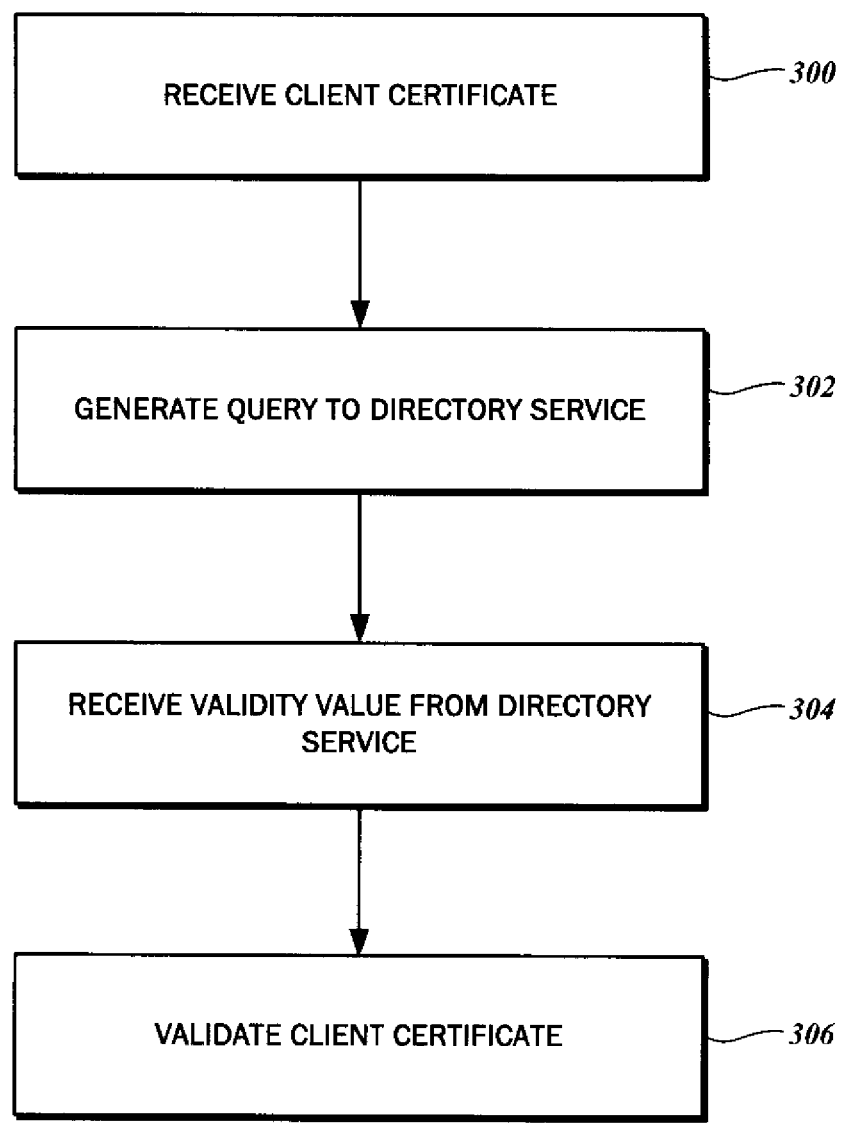
FIG. 7 is a flowchart illustrating a method for validating the client certificate.

With reference to the flowchart of FIG. 7, the method for validating the client certificate 28 being with a step 300 of receiving the client certificate 28 from the client computer system 12 as part of the authentication process to access the application resources 20. The client certificate 28 is understood to be associated with a specific client identity or account, under which access to the application resources 20 is sought. Thus, the client certificate 28 may have a user identifier that corresponds to the client identity. As previously noted, the client certificate 28 includes the validity identifier 44 that is comprised of the validity start time 44*a* and the validity end time 44*b*. The validity identifier 44 is utilized to determine the status of the client certificate 28.

In particular, as the method continues with a step 302, a query to the directory service 26 is generated. The query requests the retrieval of a first entry that is associated with the client identity, and amongst the other attributes associated therewith, there is a validity time value. Because each entry in the directory service 26 includes a unique validity time value, the specific one associated with the client identity is retrieved.

The method further includes a step 304 of receiving the validity time value from the directory service 36, followed by a step 306 of validating the client certificate 28 based upon a comparison or first evaluation of the validity identifier 44 against the validity time value set forth in the directory service 26. Generally, for the client certificate 28 to be valid, its validity start time 44*a* and its validity end time 44b must be later than the validity time value. It is expressly contemplated that the validity time value represents a point in which a certificate issued and expiring thereafter is valid, and any certificate issued or expiring before is invalid. As such, if either the validity start time 44a or the validity end time 44b occurs before the validity time value in a second or third evaluation, respectively, the client certificate 28 is deemed invalid. Based upon the step of validating the client certificate 28, access restrictions to the application resource 20 may also be removed.

Figure 8:
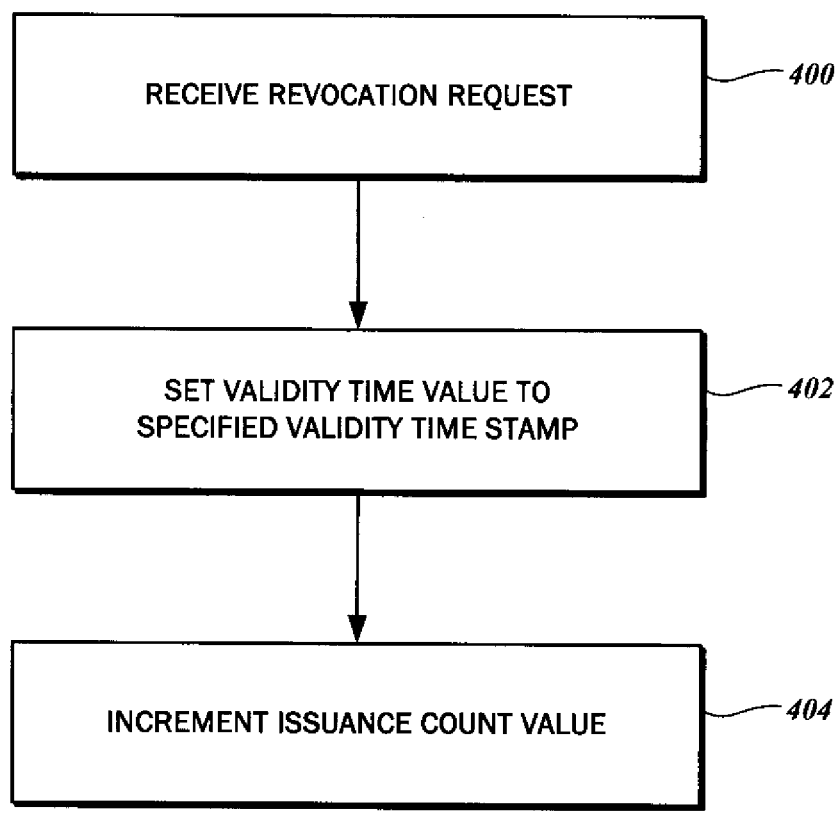
FIG. 8 is a flowchart illustrating a method for revoking the client certificate in accordance with an embodiment of the present invention.

Having considered what constitutes a valid and invalid certificate, the method for revoking the client certificate 28 selectively in accordance with one embodiment of the present invention will now be considered with reference to the flowchart of FIG. 8. The method begins with a step 400 of receiving a revocation request for the client certificate 28 that is associated with the specified client identity. As shown in FIG. 6, the second administration panel 56 includes multiple fields for specifying a validity time stamp 60 that is included with the revocation request. More particularly, the validity time stamp 60 has a set of date values 62 that identify a specific year, month, and day, and a set of time values 64 that identify a specific hour and minute. Like the first administration panel 48, the second administration panel may be generated by an embedded HTTP server of the authentication server 22, though by no means is this a requirement. The submission of the validity time stamp 60 to the authentication server 22 via the second administration panel 56 is understood to correspond to making a revocation request referenced herein.

As indicated above, the time stamps in the validity start time 44a and the validity end time 44b of the client certificate 28 in comparison to the validity time value specified in the directory service 26 establish validity. It is contemplated that by shifting the validity time value, various issued certificates may be selectively revoked. In accordance therewith, in step 402, the validity time value in a first entry of the directory service 26 (which relates to the particular client identity) is modified to the validity time stamp entered through the second administration panel 56. Essentially, all client certificates 28 issued prior to the date and time specified as the validity time stamps are revoked. By specifying a date and time before the issuance of some client certificates 28 but not of others, only those with the validity start time 44a and the validity end time 44b before such date are revoked. In order to revoke all outstanding client certificates, the validity time stamp 60 may be set to the current date and time, as by definition, all prior issued client certificates 28 have validity start times 44a and validity end times 44b before the validity time stamp 60. One embodiment of the present invention, as best illustrated in the example screen of FIG. 6, contemplates a "revoke all certificates" button 66, which is effective to reset the validity time value to the current date and time.

After modifying the validity time value in the directory service 26, the method continues with a step 404 of decrementing the issuance count value, which is representative of the number of client certificates 28 outstanding, in the pertinent entry of the directory service 26. Where all of the client certificates 28 are revoked, however, the issuance count value is reset to zero.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. A method performed by a computer system for validating a digital certificate issued to a client system and associated with a specific client identity, the method comprising:
    receiving the digital certificate from the client system, the digital certificate including a user identifier and a certificate validity period identifier, the user identifier corresponding to the specific client identity;
    generating a first query to a directory service having a plurality of entries each associated with different client identities, the first query including a request for a first entry associated with the specific client identity, the first entry including a directory validity time value for the specific client identity;
    receiving the directory validity time value returned by the directory service in response to the first query; and
    validating the digital certificate in response to determining that a certificate validity period specified by the certificate validity period identifier is later than the received directory validity time value.

2. The method of claim 1, wherein the certificate validity period is defined by a validity start time and a validity end time.

3. The method of claim 2, wherein the certificate validity period is later than the directory validity time value only if the validity start time is later than the directory validity time value.

4. The method of claim 2, wherein the method further comprises rejecting the digital certificate if the validity start time is prior to the received directory validity time value for the specific client identity.

5. The method of claim 2, wherein the method further comprises rejecting the digital certificate if the validity end time is prior to the received directory validity time value for the specific client identity.

6. The method of claim 1, further comprising:
    removing access restrictions to a network application resource upon validating the digital certificate.

7. The method of claim 6, wherein the user identifier corresponds to an account on the network application resource.

8. The method of claim 1, wherein the directory service is a lightweight directory access protocol (LDAP) compliant system.

9. The method of claim 1, wherein the directory service is a Standard Query Language (SQL) database.

10. The method of claim 1, wherein the method further comprises revoking the digital certificate in response to a modification to the directory validity time value.

11. The method of claim 1, wherein the method further comprises revoking the digital certificate in response to a modification of the directory validity time value to be later than the certificate validity period of the digital certificate.

12. The method of claim 1, wherein the method further comprises revoking the digital certificate in response to a modification of the directory validity time value to a value associated with the current date and time.

13. The method of claim 1, wherein all outstanding digital certificates associated with the specific client entity may be revoked by modifying the directory validity time value to a value associated with the current date and time.

14. The method of claim 1, wherein the directory validity time value comprises a dynamic certificate validation date.

15. The method of claim 14, wherein the dynamic certificate validation date of a directory validity time value stored on a directory service may be modified through an administration panel user interface.

16. The method of claim 15, wherein the administration panel user interface comprises multiple fields for specifying the dynamic certificate validation date of the directory validity time value returned by the directory service in response to the first query.

17. The method of claim 15, wherein the administration panel user interface comprises a revoke all certificates control, wherein selecting the revoke all certificates control revokes all outstanding digital certificates associated with the specific client entity by modifying the dynamic certificate validation date to a current date and time.

18. The method of claim 15, wherein the administration panel user interface is generated by an embedded HTTP server.

19. The method of claim 1, wherein determining that a certificate validity period specified by the certificate validity period identifier is later than the received directory validity time value comprises determining that the digital certificate was issued after the directory validity time value and that the digital certificate expires after the received directory validity time value.

20. The method of claim 1, wherein the directory validity time value comprises a set of date values that identify a specific year, month, and day, and a set of time values that identify a specific hour and minute.

* * * * *